US012722598B2

(12) United States Patent
Granieri et al.

(10) Patent No.: US 12,722,598 B2
(45) Date of Patent: Sep. 1, 2026

(54) CONTEXTUALLY ADAPTED ACCESS PRIVILEGES

(71) Applicant: Toyota Jidosha Kabushiki Kaisha, Toyota (JP)

(72) Inventors: Alexander Charles Granieri, Mountain View, CA (US); Jimmy Chiu, San Jose, CA (US); Brian Robert Hilnbrand, San Jose, CA (US); Vincent Sarcia Pascual, Dublin, CA (US); Tyler La Monda, Fairfield, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 65 days.

(21) Appl. No.: 18/916,078

(22) Filed: Oct. 15, 2024

(65) Prior Publication Data

US 2026/0103167 A1 Apr. 16, 2026

(51) Int. Cl.

*B60R 25/20* (2013.01)
*B60W 40/08* (2012.01)
*H04W 4/021* (2018.01)
*H04W 4/38* (2018.01)

(52) U.S. Cl.

CPC ............. *B60R 25/20* (2013.01); *B60W 40/08* (2013.01); *H04W 4/021* (2013.01); *H04W 4/38* (2018.02); *B60W 2040/0818* (2013.01)

(58) Field of Classification Search

CPC .................. B60R 25/20; B60W 40/08; B60W 2040/0818; H04W 4/021; H04W 4/38
USPC ......................................................... 340/5.72
See application file for complete search history.

(56) References Cited

U.S. PATENT DOCUMENTS 8,598,980 B2 * 12/2013 Evans ..................... G06F 21/32 340/5.82
9,547,985 B2 1/2017 Tuukkanen
9,618,359 B2 * 4/2017 Weast ................ G01C 21/3453
10,037,699 B1 * 7/2018 Toyoda ............. B60W 30/0956
10,046,618 B2 * 8/2018 Kirsch .................. B60W 40/08
10,323,452 B2 * 6/2019 Kwak ................ G07C 9/00309
10,593,182 B1 * 3/2020 Fields .................... G06Q 40/08
10,850,709 B1 * 12/2020 Nagata .................. B60R 25/241
11,436,864 B2 * 9/2022 Burk ...................... G06V 20/56
11,667,265 B2 * 6/2023 Bielby .................... B60R 25/25 340/5.83

(Continued)

FOREIGN PATENT DOCUMENTS

CN 112401857 A 2/2021
CN 112572455 A 3/2021
CN 116264830 A 6/2023

*Primary Examiner* — Nam V Nguyen
(74) *Attorney, Agent, or Firm* — Christopher G. Darrow; Darrow Mustafa PC

(57) ABSTRACT

Systems, methods, and other embodiments described herein relate to improving vehicle access according to a present context. In one embodiment, a method includes acquiring sensor data about an environment of a vehicle. The method includes, responsive to receiving a request for accessing the vehicle, determining a context from the sensor data. The context including aspects about the environment and about a person associated with the request for access. The method includes defining access privileges for the person according to the context in relation to a threshold. The method includes providing access to the vehicle according to the access privileges.

17 Claims, 7 Drawing Sheets

(56) References Cited

U.S. PATENT DOCUMENTS

| | | | |
|---|---|---|---|
| 11,932,198 | B2 | 3/2024 | Hassani et al. |
| 12,475,611 | B2 * | 11/2025 | Austin .................... G06T 11/00 |
| 2018/0024725 | A1 | 1/2018 | Penilla et al. |
| 2019/0291696 | A1 | 9/2019 | Munafo et al. |
| 2021/0001810 | A1 * | 1/2021 | Rivard ................. G06V 40/172 |
| 2022/0219643 | A1 | 7/2022 | Hanson et al. |
| 2022/0363264 | A1 * | 11/2022 | Bilal ..................... B60W 50/14 |
| 2023/0034583 | A1 | 2/2023 | Roberts et al. |
| 2024/0101128 | A1 | 3/2024 | Bradley et al. |
| 2025/0371638 | A1 * | 12/2025 | Marcolino Quintao Severgnini ........... G06Q 50/265 |

* cited by examiner

CONTEXTUALLY ADAPTED ACCESS PRIVILEGES

TECHNICAL FIELD

The subject matter described herein relates, in general, to the security of a vehicle and, more particularly, to determining the context of a vehicle in order to make inferences about how to provide access to the vehicle.

BACKGROUND

Vehicle security generally uses different sensors (e.g., proximity, shock, etc.) to detect different types of events that commonly correlate with attempts to break into a vehicle or otherwise effect the security of the vehicle. For example, a door sensor actuates when a door handle is activated, while a shock sensor may actuate when an impact against the vehicle occurs. Thus, the vehicle detects the various events and automatically assumes the events are security risks, resulting in, for example, activation of an audible alarm. However, this approach does not consider nuanced contextual scenarios. Moreover, a driver or other individual with a key has complete access to the vehicle even if not authorized or otherwise incapable of intelligently controlling the vehicle. Accordingly, the focus of such security systems is biased towards events that may not actually be security risks, thereby leading to false alarms while providing access to users that may result in security risks. As such, a lack of awareness in regard to contextual elements may result in reduced security for a vehicle.

SUMMARY

Example systems and methods relate to a manner of improving access to a vehicle according to context. As previously noted, some vehicle security systems focus on explicit events as discrete examples of risks to the vehicle. However, the context surrounding such events is generally not considered and the security systems further generally do not assess aspects relating to individuals that have explicit access via a key. As a result, the security systems may generate false positives while further failing to recognize risks associated with privileged users.

Therefore, in at least one arrangement, an inventive system is disclosed that functions to consider contextual aspects relating to the environment and a person requesting access to the vehicle, thereby identifying nuances relating to security risks and improving the granting of access privileges. For example, the system acquires sensor data about the surrounding environment and a person in the environment. The system uses this sensor data to determine a context that generally characterizes aspects about the surroundings of the vehicle. Thus, the context may specify a geographic location of the vehicle, nearby points of interest (e.g., bar, restaurant, store, etc.), objects in the surroundings, time of day, a presence of people and actions of the people, and other aspects that may influence the determination of access privileges.

As such, the vehicle is, in general, iteratively acquiring and processing the sensor data to determine the context so that any access privileges can be adapted to the context. The system defines the access privileges in relation to a person that is requesting access. The form of the request may be active or passive. An active request, in at least one approach, involves the person activating a key fob or manually using a key, while a passive request may involve biometric identification of the person by the vehicle and/or passive entry via a key fob. In any case, the system functions to assess the person within defining the context in order to determine the access privileges the person should be granted. Thus, the system may be assessing the person for a capability to control the vehicle in relation to a medical capacity, including a physical ability to perform actions (e.g., steering, braking, etc.), a mental awareness, a level of intoxication, and so on.

In one example, the system determines the context according to an inferred level of intoxication relating to, for example, the person being at a bar or restaurant for a period of time and thus potentially consuming alcohol. Accordingly, if the vehicle determines that the time spent parked at, for example, a bar or another location associated with the consumption of intoxicants exceeds a threshold, the system may actively challenge the person or passively monitor the person to determine whether the person is able to control the vehicle. For example, the vehicle may initially define the access privileges at a first level that permits access into the vehicle but does not permit movement of the vehicle. The vehicle may then present a challenge to the person so that the person can prove they are not intoxicated and are able to control the vehicle. The challenge may be a test administered using interfaces and sensors of the vehicle in which the vehicle instructs the person to perform various actions and then analyzes sensor data of how the person responds. Of course, the particular sobriety test may vary depending on the implementation.

Moreover, the process of challenging the person may be passive. In this approach, the system iteratively assesses actions of the person to identify movements/actions that are indicative of the person's capacity to control the vehicle and may be assessed in relation to an objective metric (e.g., horizontal gaze nystagmus). In one approach, the system may learn behaviors of the person and thus assess the person against a baseline of learned movements to determine if they are incapable of adequate control. In either case, the system is able to assess the person relative to the threshold from which the system then defines the access privileges. The access privileges relate to different functions of the vehicle that the person is permitted to control. Accordingly, the access privileges may be set at different levels, including general vehicle access, infotainment access, trunk/glove box access, or other compartment access, driving controls, and so on. The particular set of functions that the system grants access to for the person depends on the context as observed via the sensor data. In any case, the system can iteratively assess the context to dynamically adapt the access privileges to observed changes. In this way, the noted approach improves vehicle access to tailor access to the particular context.

In one embodiment, an access system is disclosed. The access system includes one or more processors and a memory communicably coupled to the one or more processors. The memory stores instructions that, when executed by the one or more processors, cause the one or more processors to acquire sensor data about an environment of a vehicle. The instructions include instructions to, responsive to receiving a request for accessing the vehicle, determine a context from the sensor data, the context including aspects about the environment and about a person associated with the request for access. The instructions include instructions to define access privileges for the person according to the context in relation to a threshold. The instructions include instructions to provide access to the vehicle according to the access privileges.

In one embodiment, a non-transitory computer-readable medium including instructions that, when executed by one or more processors, cause the one or more processors to perform one or more functions is disclosed. The instructions include instructions to acquire sensor data about an environment of a vehicle. The instructions include instructions to, responsive to receiving a request for accessing the vehicle, determine a context from the sensor data, the context including aspects about the environment and about a person associated with the request for access. The instructions include instructions to define access privileges for the person according to the context in relation to a threshold. The instructions include instructions to provide access to the vehicle according to the access privileges.

In one embodiment, a method is disclosed. In one embodiment, the method includes acquiring sensor data about an environment of a vehicle. The method includes, responsive to receiving a request for accessing the vehicle, determining a context from the sensor data, the context including aspects about the environment and about a person associated with the request for access. The method includes defining access privileges for the person according to the context in relation to a threshold. The method includes providing access to the vehicle according to the access privileges.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
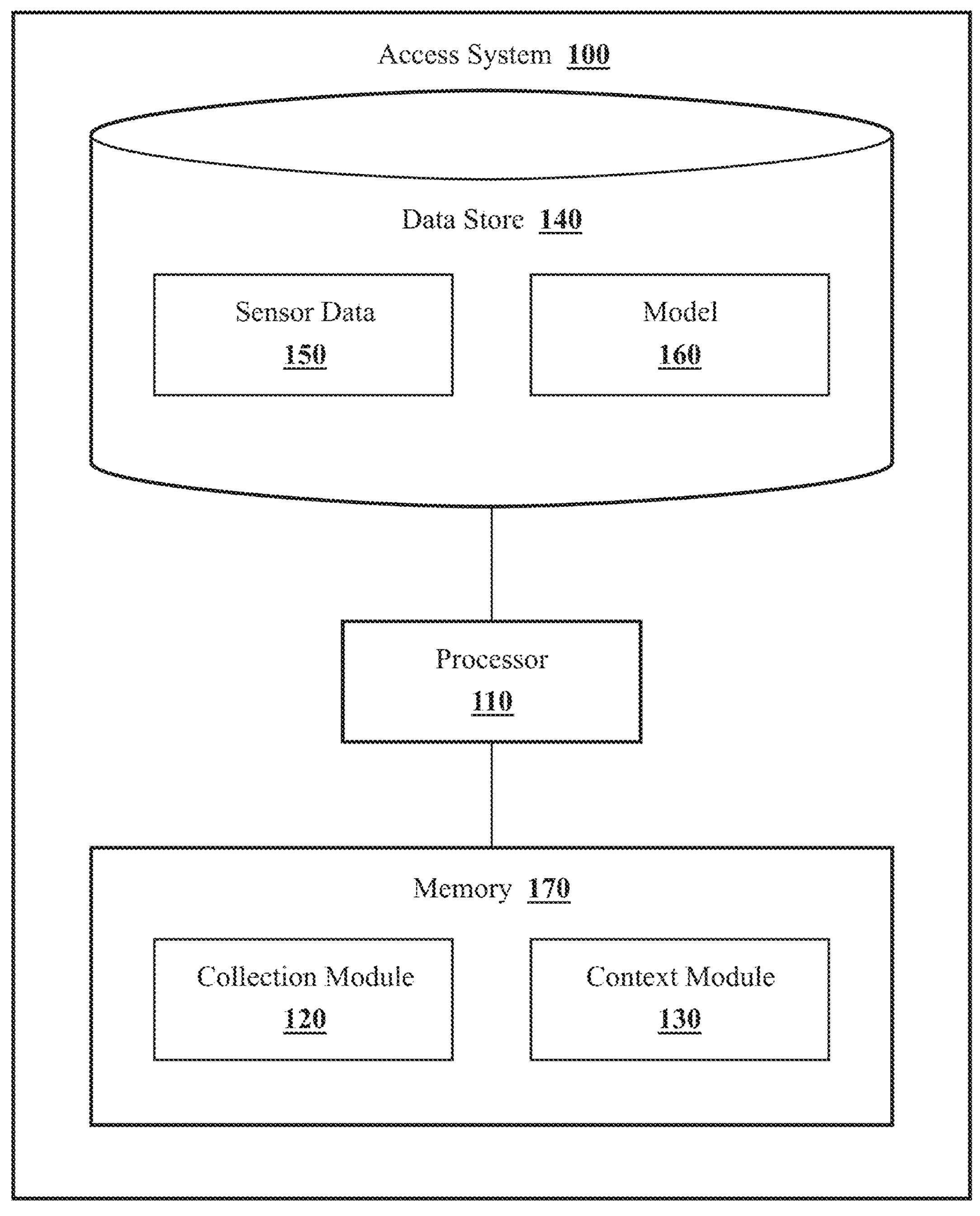
FIG. 1 illustrates one embodiment of an access system that is associated with providing contextually-based access to a vehicle.

Systems, methods, and other embodiments associated with improving access to a vehicle according to context. As previously noted, some vehicle security systems focus on explicit events as discrete examples of risks to the vehicle. However, the context surrounding such events is generally not considered and the security systems further generally do not assess aspects relating to individuals that have explicit access via a key. As a result, the security systems may generate false positives while further failing to recognize risks associated with privileged users.

Therefore, in at least one arrangement, an inventive system is disclosed that functions to consider contextual aspects relating to the environment and a person requesting access to the vehicle, thereby identifying nuances relating to security risks and improving the granting of access privileges. For example, the system acquires sensor data about the surrounding environment and a person in the environment. The system uses this sensor data to determine a context that generally characterizes aspects about the surroundings of the vehicle. Thus, the context may specify a geographic location of the vehicle, nearby points of interest (e.g., bar, restaurant, store, etc.), objects in the surroundings, time of day, a presence of people and actions of the people, and other aspects that may influence the determination of access privileges.

As such, the vehicle is, in general, iteratively acquiring and processing the sensor data to determine the context so that any access privileges can be adapted to the context. The system defines the access privileges in relation to a person that is requesting access. The form of the request may be active or passive. An active request, in at least one approach, involves the person activating a key fob or manually using a key, while a passive request may involve biometric identification of the person by the vehicle and/or passive entry via a key fob. In any case, the system functions to assess the person within defining the context in order to determine the access privileges the person should be granted. Thus, the system may be assessing the person for a capability to control the vehicle in relation to a medical capacity, including a physical ability to perform actions (e.g., steering, braking, etc.), a mental awareness, a level of intoxication, and so on.

In one example, the system determines the context according to an inferred level of intoxication relating to, for example, the person being at a bar or restaurant for a period of time and thus potentially consuming alcohol. Accordingly, if the vehicle determines that the time spent parked at, for example, a bar or another location associated with the consumption of intoxicants, exceeds a threshold, the system may actively challenge the person or passively monitor the person to determine whether the person is able to control the vehicle. For example, the vehicle may initially define the access privileges at a first level that permits access into the vehicle but does not permit movement of the vehicle. The vehicle may then present a challenge to the person so that the person can prove they are not intoxicated and are able to control the vehicle. The challenge may be a test administered using interfaces and sensors of the vehicle in which the vehicle instructs the person to perform various actions and then analyzes sensor data of how the person responds. Of course, the particular sobriety test may vary depending on the implementation.

Moreover, the process of challenging the person may be passive. In this approach, the system iteratively assesses actions of the person to identify movements/actions that are indicative of the person's capacity to control the vehicle and may be assessed in relation to an objective metric (e.g., horizontal gaze nystagmus). In one approach, the system may learn behaviors of the person and thus assess the person against a baseline of learned movements to determine if they are incapable of adequate control. In either case, the system is able to assess the person relative to the threshold from which the system then defines the access privileges. The access privileges relate to different functions of the vehicle that the person is permitted to control. Accordingly, the access privileges may be set at different levels, including general vehicle access, infotainment access, trunk/glove box access, or other compartment access, driving controls, and so on. The particular set of functions that the system grants access to for the person depends on the context as observed via the sensor data. In any case, the system can iteratively assess the context to dynamically adapt the access privileges to observed changes. In this way, the noted approach improves vehicle access to tailor access to the particular context.

With reference to FIG. 1, one embodiment of an access system 100 is further illustrated. The access system 100 is shown as including a processor 110, which may be from a vehicle 700 of FIG. 7 or may be associated with a separate computing device, such as a server, cloud-computing system, and so on. Accordingly, the processor 110 may be a part of the access system 100, the access system 100 may include a separate processor from the processor 710 of the vehicle 700, or the access system 100 may access the processor 110 through a data bus or another communication path. In one embodiment, the access system 100 includes a memory 170 that stores a collection module 120 and a context module 130. The memory 170 is a random-access memory (RAM), read-only memory (ROM), a hard-disk drive, a flash memory, or another suitable memory for storing the modules 120 and 130. The modules 120 and 130 are, for example, computer-readable instructions that when executed by the processor 110 cause the processor 110 to perform the various functions disclosed herein. In alternative arrangements, the modules 120 and 130 are independent elements from the memory 170 that are, for example, comprised of hardware elements (e.g., arrangements of logic gates). Thus, the modules 120 and 130 are alternatively ASICs, hardware-based controllers, a composition of logic gates, or another hardware-based solution.

Figure 2:
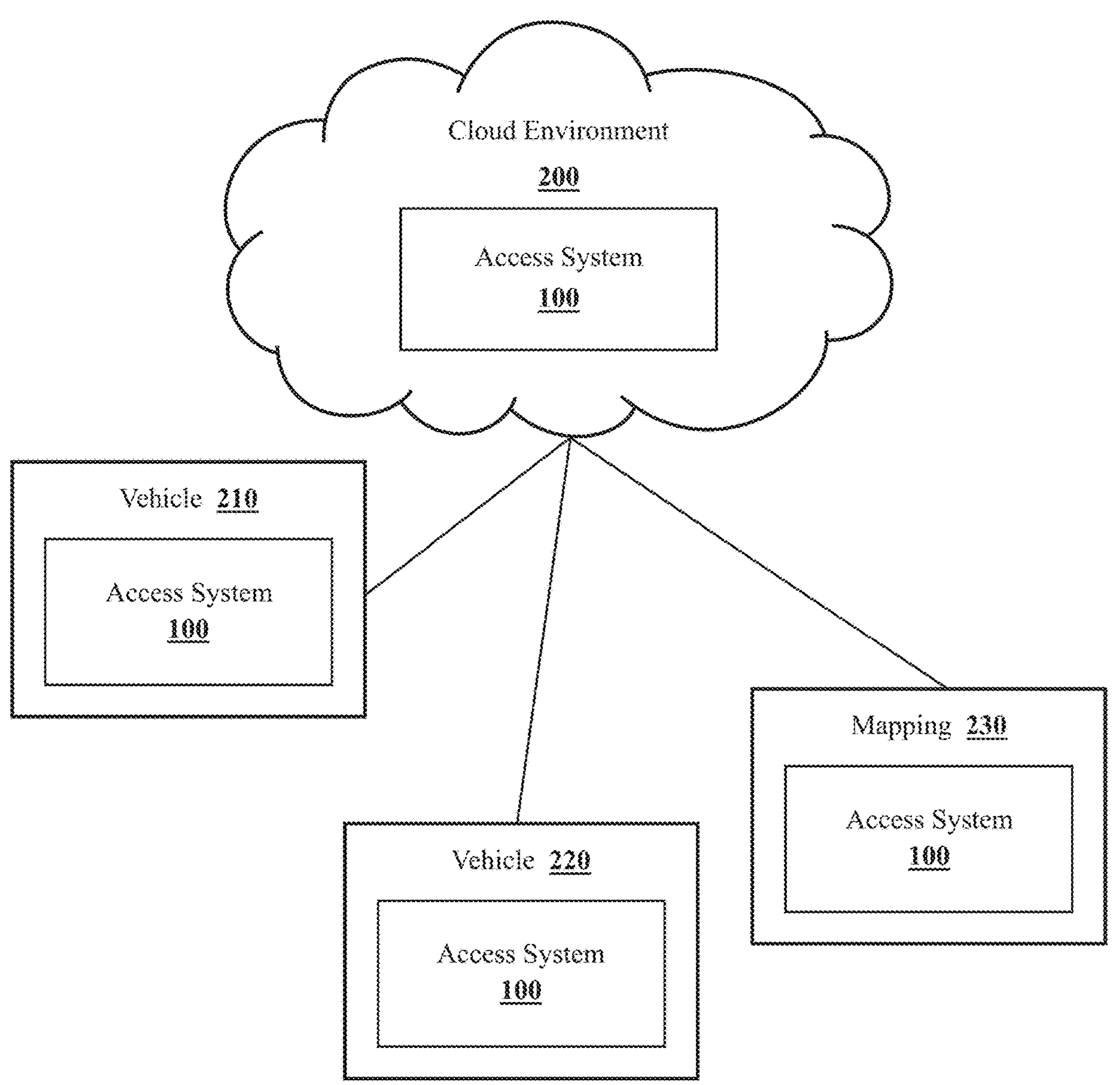
FIG. 2 illustrates one embodiment of the access system of FIG. 2 in a cloud-computing environment.

The access system 100, as illustrated in FIG. 1, is generally an abstracted form of the access system 100 as may be implemented, for example, between the vehicle 700 and a cloud-computing environment 200. FIG. 2 illustrates one example of a cloud-computing environment 200 that may be implemented along with the access system 100. As illustrated in FIG. 2, the access system 100 is embodied at least in part within the cloud-computing environment 200.

In one or more approaches, the cloud environment 200 may facilitate communications between multiple different vehicles to acquire and distribute information between vehicles 210, 220, and 230. Accordingly, as shown, the access system 100 may include separate instances within one or more entities of the cloud-based environment 200, such as servers, and also instances within vehicles that function to acquire, and analyze the noted information. In a further aspect, the entities that implement the access system 100 within the cloud-based environment 200 may vary beyond transportation-related devices and encompass mobile devices (e.g., smartphones), and other devices that may benefit from the functionality discussed herein. Thus, the set of entities that function in coordination with the cloud environment 200 may be varied. In one approach, functionality associated with at least one module of the access system 100 is implemented within the vehicle 700, while further functionality is implemented within a cloud-based computing system. Thus, the access system 100 may include a local instance at the vehicle 700 and a remote instance that functions within the cloud-based environment. In yet further arrangements, the access system 100 may be wholly embodied within the vehicle.

Moreover, the access system 100, as provided for herein, may function in cooperation with a communication system. In one embodiment, the communication system communicates according to one or more communication standards. For example, the communication system can include multiple different antennas/transceivers and/or other hardware elements for communicating at different frequencies and according to respective protocols. The communication system, in one arrangement, communicates via a communication protocol, such as a WiFi, DSRC, V2I, V2V, or another suitable protocol for communicating between the vehicle and other entities in the cloud environment. Moreover, the communication system, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle communicating with various remote devices (e.g., a cloud-based server). In any case, the access system 100 can leverage various wireless communication technologies to provide communications to other entities, such as members of the cloud-computing environment.

With continued reference to FIG. 1, in one embodiment, the access system 100 includes the data store 140. The data store 140 is, in one embodiment, an electronic data structure stored in the memory 170 or another data storage device that is configured with routines that can be executed by the processor 110 for analyzing stored data, providing stored data, organizing stored data, and so on. Thus, in one embodiment, the data store 140 stores data used by the modules 120 and 130 in executing various functions. In one embodiment, the data store 140 stores the sensor data 150, and the model 160.

The collection module 120 generally includes instructions that function to control the processor 110 to acquire data inputs that form the sensor data 150. In various arrangements, the sensor data 150 may be acquired from sensors of the vehicle 700, from separate remote devices, such as nearby vehicles, roadside units (RSUs), and so on. For example, the sensor data 150 can include, in various arrangements, observations of one or more objects in an environment proximate to the vehicle 700, observations of a passenger cabin, observations of a person, and/or other aspects about the surroundings. As provided for herein, the collection module 120, in at least one embodiment, acquires sensor data 150 that includes vehicle location, camera images, and so on. The collection module 120 acquires the sensor data 150 from sensors such as a radar 723, a LiDAR 724, a camera 726, and/or other sensors as may be suitable for identifying aspects of the surrounding environment and about the driver. Moreover, while raw sensor information is described, the collection module 120 may further acquire processed data that forms derived observations of the surrounding environment, such as detections of objects in the surroundings, aspects about the driver (e.g., eye gaze, coordination of movements, etc.), and so on. Alternatively, the collection module 120 may process the data into different observations using the model 160, which may be a machine-learning model.

Accordingly, the collection module 120, in one embodiment, controls the respective sensors to provide the data inputs in the form of the sensor data 150 or at least receives the sensor data 150 via one or more intermediaries therefrom. Moreover, the collection module 120 can undertake various approaches to fuse data from multiple sensors when providing the sensor data 150 and/or from sensor data acquired over a wireless communication link (e.g., v2v) from one or more of other entities (e.g., surrounding vehicles). Thus, the sensor data 150, in one embodiment, represents a combination of perceptions acquired from multiple sensors and/or entities.

The collection module 120, in one embodiment, includes instructions that cause the processor 110 to initially acquire the sensor data 150 and then, in at least one approach, process the sensor data 150 using the model 160. The model 160 is, in at least one arrangement, a machine-learning model, such as a neural network. In any case, the model 160 is generally integrated with the collection module 120 and functions to process the sensor data 150 into observations. Accordingly, the collection module 120, in one or more configurations, may control various aspects of the vehicle 700 to acquire information and may further control different interfaces within the vehicle 700 to interact with the driver when, for example, presenting a challenge.

With continued reference to FIG. 1, the context module 130, in at least one approach, includes instructions that cause the processor 110 to define access privileges within the vehicle 700 and control elements of the vehicle 700 according to the access privileges. In one arrangement, the context module 130 accepts the sensor data 150 or derived observations from the sensor data 150 in order to assess the context. That is, the context module 130 uses the acquired information in order to determine the context from which the module 130 can define the context. Thus, the context module 130 may track different aspects of the surroundings and individuals. For example, the context module 130 may determine a current location of the vehicle 700, a duration of time spent at the current location, points of interest (POIs) proximate to the location, objects present in the surroundings, characteristics of one or more people, and so on. From these observations, the context module 130 determines the context, which generally characterizes the surroundings and an influence on the driver.

By way of example, the context module 130 can identify a location and POIs at the location. When the POIs include places at which the driver may perform some action that can influence their ability to control or otherwise access the vehicle 700, then the system 100 may define the context accordingly such that the access privileges are at least temporarily adapted until the capacity of the driver can be otherwise verified. In one example, the system 100 determines that the vehicle 700 is parked at a pub according to an identified location and a proximity to the location of the pub (e.g., parked within a parking lot of the pub). The system 100 may categorize the POIs according to type, such as POIs that may influence the ability of the driver and POIs that are not likely to influence the ability of the driver. For example, POIs that are likely to influence the driver can include, restaurants, bars, medical facilities, and so on. By contrast, POIs that are not likely to influence the driver can include parks, work office, athletic facilities, etc.

When the context module 130 identifies the presence of the vehicle at a particular POI, then the context module 130 may define the context accordingly and proceed with further monitoring functions, such as, for example, timing a duration of a stay at the POI, monitoring the driver upon approaching the vehicle to determine a state of the driver, etc. As such, the context module 130 can then define the access privileges according to the current context. Thus, when the context module 130 determines that the context indicates the vehicle has been present at the POI beyond a defined period of time (e.g., 30 minutes), then the access privileges may be defined according to a first set of functions that are, for example, limited to accessing the interior of the vehicle without accessing controls. The context module 130 can then dynamically adapt the access privileges according to changes within the context.

That is, the context module 130 defines the context according to the understanding that the driver may be impaired. However, if/when this perception changes of the context changes, then the context module 130 may redefine the access privileges. In one example, the system 100 administers a test/challenge to the driver in order to assess a state of sobriety/medical capacity to control the vehicle 700. It should be appreciated that while the present example describes an intoxicant, such as alcohol, the system 100 is generally functioning to assess the driver without specific regard to the type of impairment. That is, the system 100 assesses the overall medical capacity of the driver to adequately control the vehicle 700. Thus, the assessment can be in relation to medical impairments (e.g., blood sugar levels, epileptic episodes, strokes, mental awareness due to narcolepsy or lack of sleep, physical maladies, etc.) and also in relation to intoxicants, such as prescription drugs, alcohol, illegal drugs, and so on. Consequently, the system 100 may determine to challenge the driver, either actively or passively, in order to make a further assessment of the context and the correlating access privileges.

The challenge itself may be active in that the vehicle 700 explicitly requests the driver to perform various actions, such as moving hands/arms, speaking certain phrases, and/or performing another task as may be appropriate to determine the capacity of the driver to control the vehicle 700. In the case of a passive challenge, the system 100 may observe the driver in relation to movements (e.g., eye movements, walking, arm movements, speech, etc.). The system 100 can assess the movements with respect to a learned way in which the driver is known to behave and/or in relation to objective metrics. In this way, the system 100 is able to ensure the safety of the vehicle 700 and the users of the vehicle 700.

Figure 3:
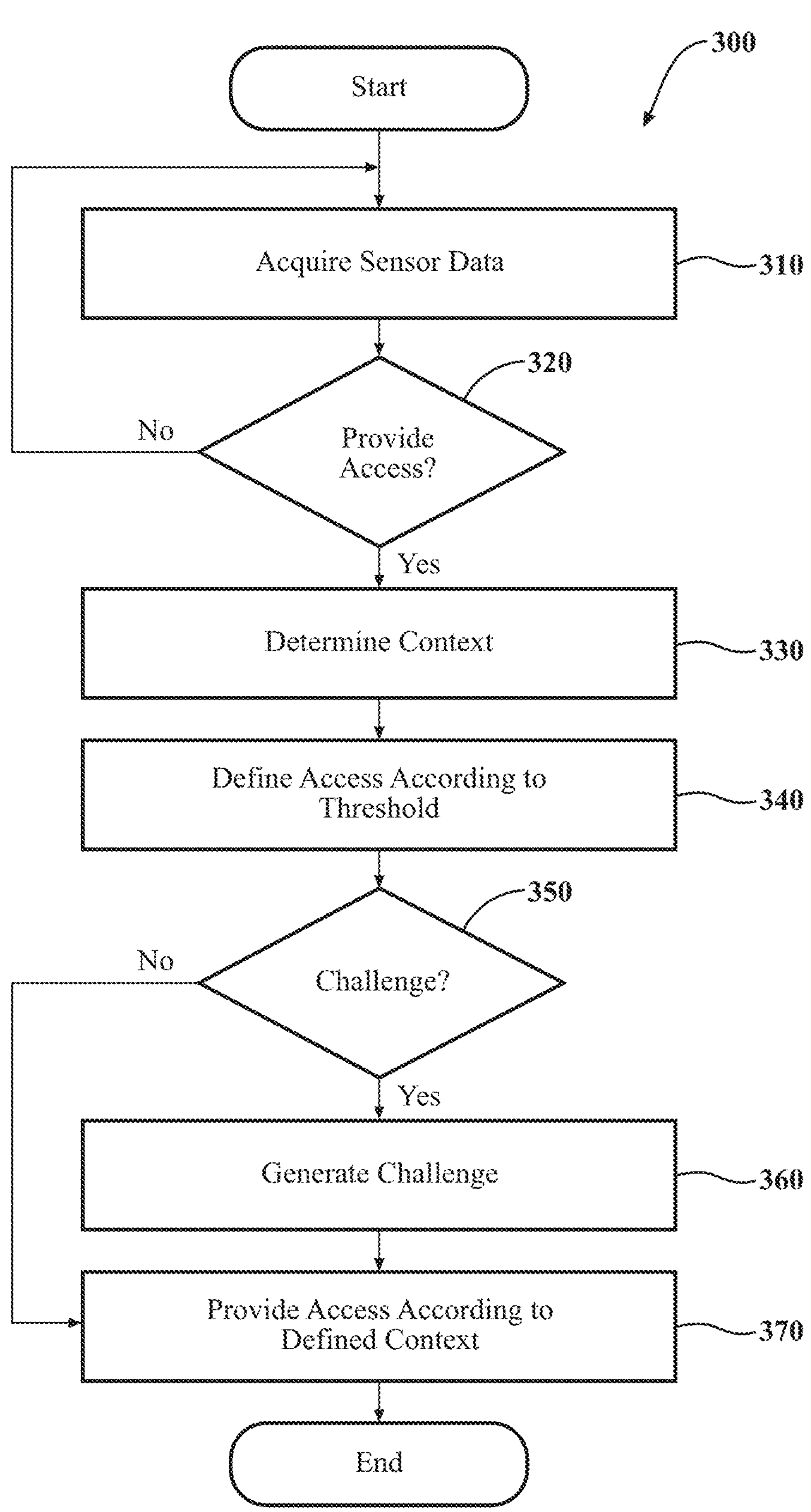
FIG. 3 illustrates a flowchart for one embodiment of a method that is associated with determining a context and defining access privileges to a vehicle according to the context.

Additional aspects of contextually adapted access privileges will be discussed in relation to FIG. 3. FIG. 3 illustrates a flowchart of a method 300 that is associated with defining access privileges according to a current context. Method 300 will be discussed from the perspective of the access system 100 of FIGS. 1 and 2. While method 300 is discussed in combination with the access system 100, it should be appreciated that the method 300 is not limited to being implemented within the access system 100 but is instead one example of a system that may implement the method 300.

At 310, the collection module 120 acquires sensor data 150. It should be appreciated that acquiring the sensor data 150, while shown as a single discrete instance, generally occurs iteratively as a series of observations over time. In this way, the collection module 120 is able to capture movements/actions in addition to instantaneous observations. In any case, the sensor data 150 is information from sensors of the vehicle 700 that embodies an area around the vehicle 700, and also within the vehicle 700. Of course, in further aspects, the sensor data 250 may also include information from other devices, including other vehicles, infrastructure devices, and so on that the access system 100 acquires via wireless communications (e.g., V2X).

Additionally, as previously highlighted, the collection module 120 may process the sensor data 150 by, for example, extracting features from the sensor data 150 about a context that includes the surrounding environment, an interior space of the vehicle 700, and/or about the driver and/or passengers of the vehicle 700. That is, the collection module 120 processes the sensor data 150 and identifies aspects pertaining to the ability of the driver to control the vehicle. In practice, the collection module 120 is identifying characteristics of the driver and surrounding aspects of the environment that relate to the security of the vehicle, and, in particular, to an ability of the driver to control the vehicle 700.

In any case, the collection module 120 uses the model 160 to detect, classify and analyze aspects of the current context, such as behaviors of the driver, aspects of the current location, and so on. Accordingly, the model 160 analyzes the sensor data 150 to derive the features that generally include intrinsic and extrinsic aspects. The intrinsic aspects relate to, for example, human poses, behaviors, physiological characteristics, etc., while the extrinsics define aspects surrounding the driver, such as the environment, presence of different objects, other passengers, etc. Thus, the features serve as contextual indicators that provide insights about whether the driver is incapacitated or other threats exist that influence the ability of the driver to control the vehicle 700.

At 320, the collection module 120 monitors for a request to access the vehicle 700. The form of the request may vary depending on the particular embodiment. For example, the request may be either active or passive. An active request is a request in which the driver or other person activates a key fob, uses or key, or otherwise makes a deliberate action to unlock and access the vehicle 700. By contrast, a passive request is passive and thus relies on the vehicle 700 sensing the presence of the person via passive keyless entry from a key fob, a mobile device, or through analysis of the sensor data 150 as the person approaches the vehicle 700 (e.g., biometric identification, such as facial recognition). Whichever approach is undertaken, the access system 100 proceeds to determine the context and define the access privileges according to the request. It should be noted that even though a person may have possession of a key, a key fob, or another element that permits access into the vehicle 700, the access system 100 is able to adapt the access privileges, including even denying access into the vehicle 700 when the access system 100 determines the context indicates associated access privileges.

At 330, the context module 130 determines a context from the sensor data 150. In one or more arrangements, the context module 130 accepts the sensor data 150 and/or observations derived from the sensor data 150. In general, the context includes aspects about the environment and about a person associated with the request for access such that the context can define security risks associated with the person entering and controlling the vehicle 700. Accordingly, determining the context generally involves identifying influences on the person from the available observations. As such, the context module 130 considers a location of the vehicle 700 in relation to different points of interest (POIs), and a duration of time that the vehicle 700 has been at the POI. In further aspects, the context module 130 determines the presence of different objects, such as the presence of other people, objects being carried by the person attempting to access the vehicle 700 (e.g., drinks, bags, crutches, etc.), objects present in the surrounding environment, driving conditions (e.g., weather, time of day, etc.), and so on. Moreover, the context module 130 further considers explicit behaviors of the person, such as movements of the person indicating a current state of the person (e.g., walking slowly, walking with an abnormal gait, erratic body movements, etc.), actions of the person (e.g., drinking, smoking, talking, etc.), interactions with other people and/or objects, and so on. The foregoing is provided as a list of examples but should not be construed as an exhaustive list of considerations undertaken by the context module 130 in defining the context.

Additionally, while the various aspects are described in general terms, it should be appreciated that the context module 130 also considers the extent of the occurrence of separate aspects. For example, the context module 130 assesses the different aspects in relation to a threshold for characterizing the particular level of access privileges. By way of example, the context module 130 can define objective metrics for different contexts and associated actions. In the case of parking at a particular location, such as a restaurant or pub, the module 130 may define the metric as a duration of time according to the particular POA. That is, an average time (e.g., one hour) for having a meal can be used as the metric, which then triggers a reduction in the access privileges when the time exceeds the average. The access system 100 may determine the average time according to information about standard times for vehicles to park at that location, according to generally known times for dining out, and so on. Moreover, the access system 100 may consider various mitigating factors, including a place of work for the driver (i.e., the driver works at the POI), the occurrence of particular events at the POI that may be associated with an increased risk of behaviors, the presence of other people with the driver, and so on.

In further examples, the objective metrics may relate to other context-specific aspects. For example, the objective metrics may consider a gait of the person in relation to a gait for someone of comparable size, a horizontal gaze nystagmus reaction, the occurrence of movements associated with different medical conditions (e.g., slump head for sleeping, stumbling, etc.), explicitly defined restrictions (e.g., person x is only permitted to drive alone, no animals are permitted in the vehicle, no consumption of beverages, driving beyond a certain speed is not permitted, etc.), and so on.

Separately, the context module 130 may also use learned behaviors and/or information in order to determine the context. For example, the access system 100 may learn biometrics of the driver, including common movements of the driver (e.g., gait), facial expressions, speech patterns, and so on. Learning may involve using a machine learning model, such as model 160, that is trained with a set of examples of the particular person in order to learn the specific characteristics associated with that person. The system can then apply the model to observations in order to characterize whether the observed behaviors are consistent with the person or whether they deviate from a baseline of learned behaviors.

The context module 130 may further learn particular patterns or information about broader activities of a user. For example, the context module 130 may learn common routes driven by a person, common amounts of time spent at different locations and associated states of the person, and so on. In this way, the context module 130 may be able to assess observations of the person against learned baseline behaviors in order to determine when the person deviates from expected behaviors and may be incapacitated. In any case, overall, the access system 100 determines the context to characterize at least whether the person is medically capable of operating the vehicle 700. As noted, the process of characterizing the context can involve applying an objective metric and/or a learned metric, which generally provides an assessment in relation to a threshold, such as a time threshold, a baseline behavior threshold, a discrete occurrence threshold (e.g., the presence of passengers or not), and so on.

Whichever approach or combination of approaches that are undertaken, the access system 100 generally functions to iteratively determine the context relative to the sensor data 150 is iteratively acquired. Consequently, the determination of the context and defining the access privileges may occur when the person initially attempts to access the vehicle (e.g., is approaching the vehicle), initially attempts to drive the vehicle, and/or as the person drives the vehicle along a route. In this way, the access system 100 can ensure the maintained security of the driver and the vehicle 700.

At 340, the context module 130 defines the access privileges according to the context. In one or more arrangements, the context module 130 may define the access privileges in relation to the threshold, as previously described. In general, the context module 130 defines the access privileges by defining which functions of the vehicle 700 the person is permitted to access. Thus, the functions of the vehicle 700 may be assigned different values or categories, and depending on the context, the access system 100 can selectively provide access to the different functions. By way of example and following the prior scenario, the context module 130 may permit access into the vehicle 700 but may not permit control of the vehicle 700 in relation to driving. That is, the person may be able to get into a passenger compartment of the vehicle 700, but may be restricted from, for example, engaging the vehicle 700 into drive or reverse.

In further arrangements, the access privileges may be defined according to different sets/levels according to particular implementations. For example, the access privileges may be arranged to permit access to only certain areas of the vehicle, such as a trunk or a passenger compartment without access to a glove box. In yet further arrangements, the access privileges may limit certain driving functions, such as speed, a geographic area in which the vehicle 700 is permitted, etc. In yet a further example, the access system 100 may limit access to ancillary functions, such as the infotainment system, a moon roof, and so on. The foregoing is provided as a list of examples and should not be construed as limiting the possible arrangements of access privileges. In general, the access system 100 may group the functions of the vehicle 700 in numerous different ways and according to the context, including the identity of the person, the medical capacity of the person, and aspects of the environment.

At 350, the context module 130 determines whether the driver or other person is to be challenged. It should be noted that while challenging the person is discussed as a discrete, separate function, in one or more arrangements, the access system 100 may iteratively challenge the person in a passive manner by, for example, determining the correspondence/variation with the different metrics. In any case, the context module 130 determines whether to challenge the person according to the defined context relative to the threshold. That is, by way of example, when the duration of time parked at the POI exceeds the threshold, then the access system 100 may proceed with a further challenge to determine whether the person is able to adequately control the vehicle. Similarly, when the context module 130 determines that the behaviors (e.g., gait, speech, etc.) of the person vary beyond the threshold, then the access system 100 may administer a further challenge.

At 360, context module 130 generates a challenge to the person. In at least one arrangement, the context module 130 generates the challenge as a test that is presented within the vehicle 700. As noted previously, the challenge may vary in form but can include an active challenge that involves displaying instructions to a user via one or more displays in the vehicle 700, presenting audio instructions, and/or a combination thereof. Presenting the challenge in this way is an active challenge that generally involves the person performing a task, such as moving hands to touch their nose, interacting with a game or other set of instructions on a display, performing a horizontal gaze nystagmus test, or performing another action in order to gauge the current capacity of the person. In further arrangements, the challenge may be passive in that the access system 100 continues to monitor the person and performs further comparisons against metrics, whether objective or learned. In any case, the access system 100 challenges the person either actively or passively and from this challenge can dynamically adapt the access privileges. Continuing with the intoxicated driver example, when the access system 100 challenges the driver and the driver passes the challenge, the access system 100 may adjust the access privileges to provide control of the vehicle 700 to the driver. Otherwise, the access system 100 may maintain the access privileges or reduce the access privileges.

At 370, the access system 100 provides access to the vehicle according to the access privileges. That is, the access system 100 can activate or deactivate different functions according to the access privileges. For example, the access system 100 may disable vehicle inputs, such as a shifter for changing from a parked state to a driving or reverse state. Alternatively, the access system 100 may disable steering, an accelerator pedal, a brake pedal, etc. In further aspects, the access system 100 can disable the infotainment system or parts thereof, windows, doors, and locks. As specified previously, the access system 100 can control access to any function of the vehicle 700.

Figure 4:
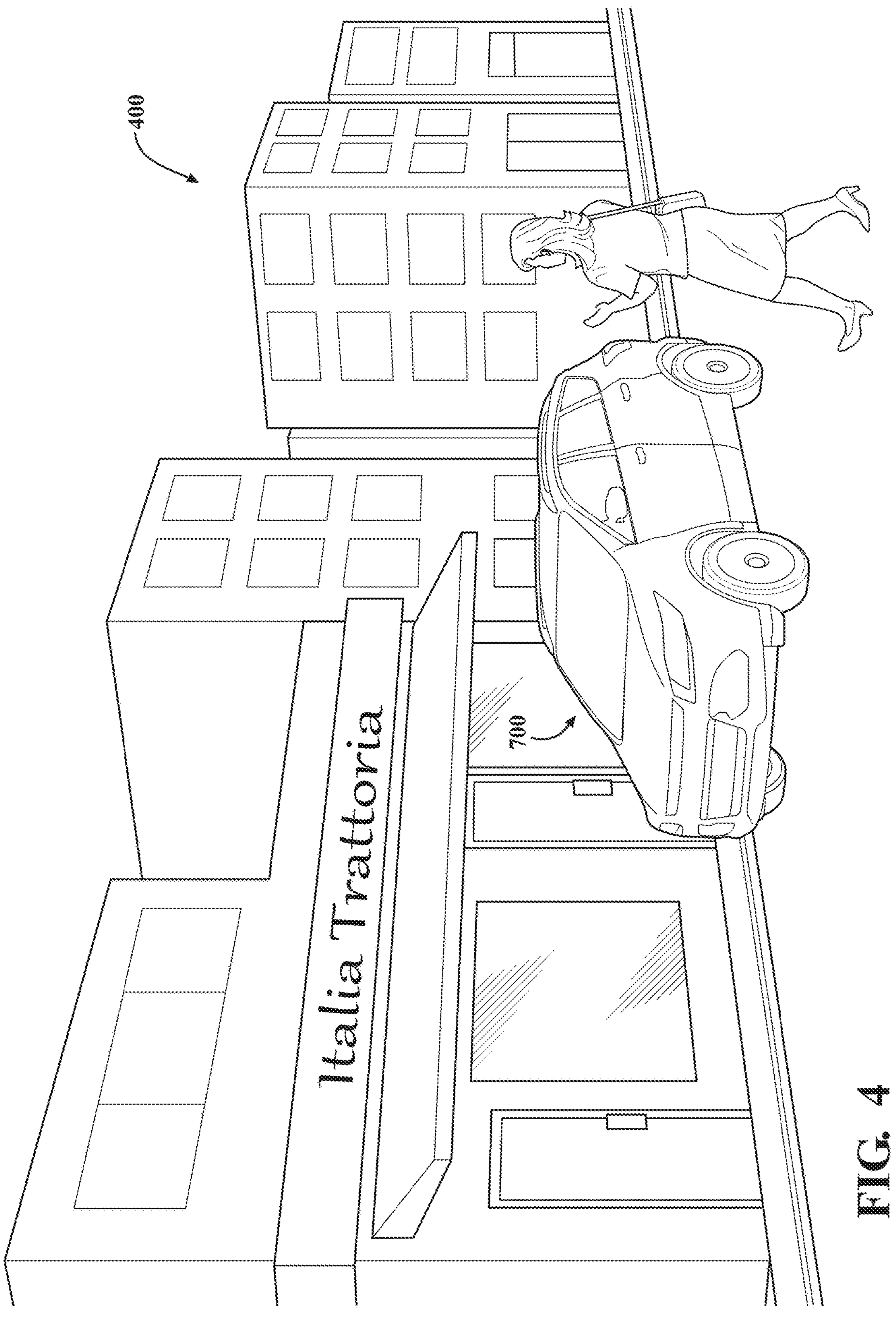
FIG. 4 illustrates an example scenario associated with a person approaching a vehicle to access the vehicle.

Continuing to FIG. 4, an example scenario 400 is illustrated. The scenario 400 illustrates a person approaching the vehicle 700. As described previously, the access system 100 detects the person approaching the vehicle 700 along with other information about the environment, such as a location at which the vehicle 700 is parked (e.g., a restaurant), a duration of time the vehicle 700 has been parked, and so on. In at least one arrangement, the access system 100 may further observe behaviors of the person as the person approaches the vehicle 700. From this information, the access system 100 can determine the context according to the objective metrics and/or the subjective learned metrics. In either case, based on the determined context, including, for example, behaviors of the driver, a duration of time at the location, the type of POI at which the vehicle 700 is parked, and so on, the access system 100 defines the access privileges.

In the instant scenario, the access system 100 may determine that the duration of time at the location exceeds a threshold and thus the person may be intoxicated. In this instance, the access system 100 may deny entry to the vehicle 700 or may provided limited access to the vehicle 700 without driving privileges. Thereafter, via an active challenge or a passive challenge, the access system 100 may refine the context by determining further information about the state of the person. That is, the access system 100 may present a sobriety test via various systems of the vehicle 700 from which the access system 100 can then further assess a state of the person and adjust the access privileges to either provide more access or to maintain or further limit the access. In this way, the access system 100 is able to perceive the context and define the access privileges in a focused way according to the context.

Figure 5:
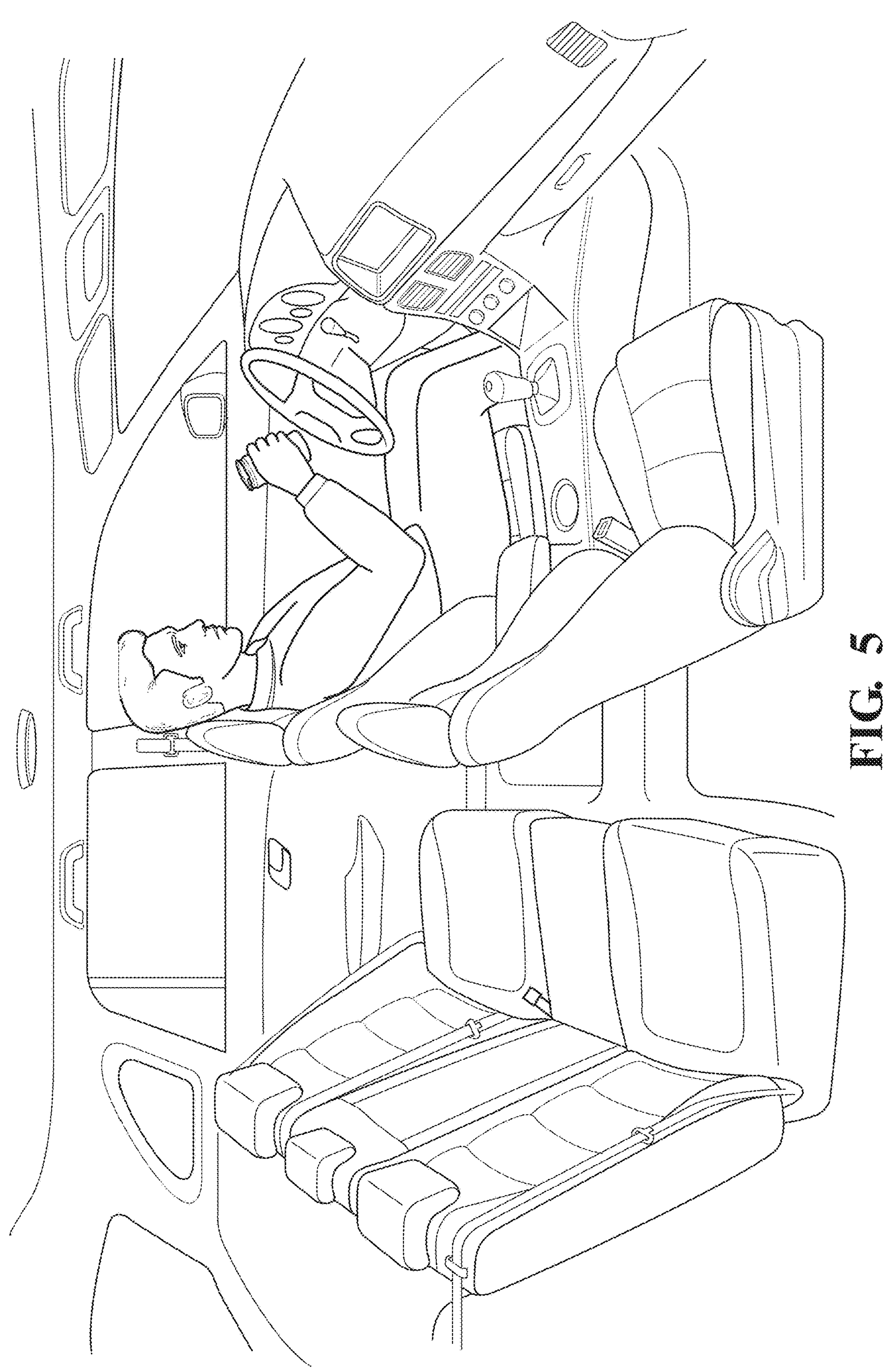
FIG. 5 illustrates an example scenario associated with adapting access privileges according to behaviors of a driver.

FIG. 5 illustrates an example scenario 500 associated with adapting access privileges according to behaviors of a driver. In the scenario 500, a driver is currently controlling the vehicle 700 and has begun to hold and drink a beverage. Thus, while the vehicle 700 is underway, the access system 100 continues to monitor the environment and the driver for iteratively determining the context and re-defining the access privileges. As such, the access system 100 is able to adapt the access privileges even when the driver is already controlling the vehicle 700. In the instant example, a policy may dictate that the consumption of beverages is not permitted in the vehicle 700 when, for example, the vehicle 700 is a rental vehicle. Additionally, or alternatively, if the beverage is an alcoholic beverage, then the access system 100 may further identify this as part of the context. Accordingly, the access system 100 can then modify the access privileges to limit further control, which may involve causing the vehicle 700 to pull over, providing explicit instructions to the driver, and so on.

Figure 6:
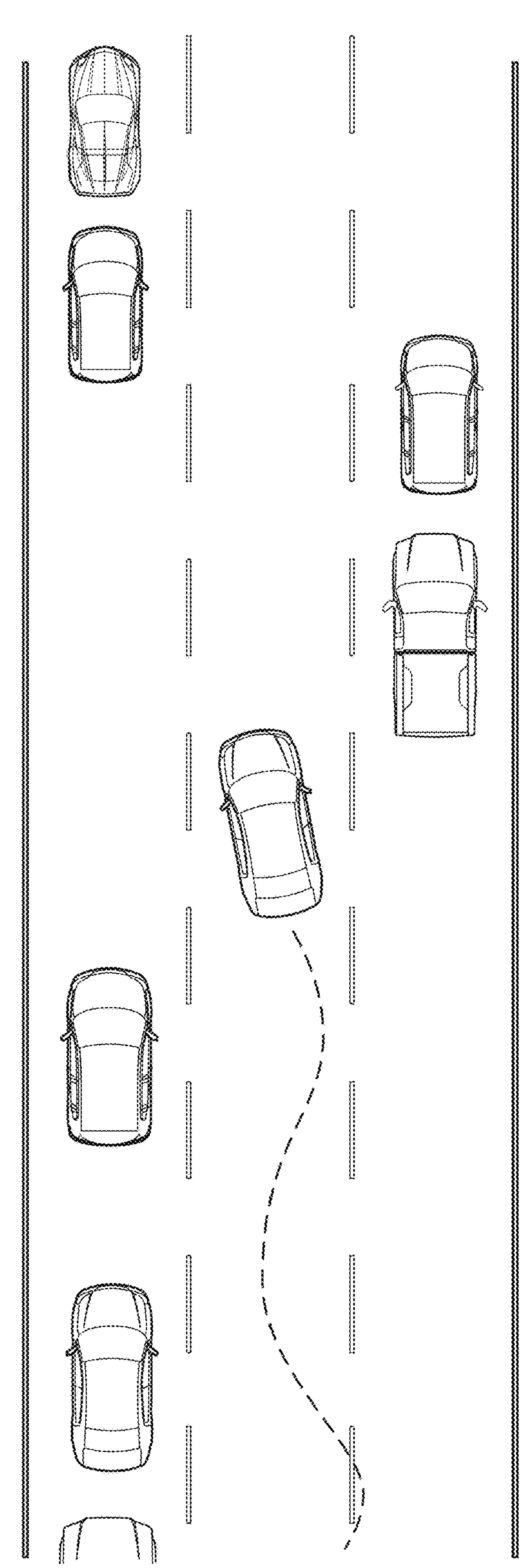
FIG. 6 illustrates an example scenario associated with adapting access privileges according to driving behaviors.
Figure 6:
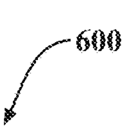

FIG. 6 illustrates an example scenario 600 associated with adapting access privileges according to driving behaviors. As shown in the scenario 600, the vehicle 700 is being controlled in an erratic manner to swerve within the lane and even over a lane line. Thus, the access system 100 observes the controls and may further observe the presence of other vehicles on the road. From this, the access system 100 determines the context to involve dangerous vehicle control on a populated roadway. Consequently, the access system 100 may adapt the access privileges to, for example, limit a speed of the vehicle 700, cause the driver to pull over, and/or adapt other functions in order to ensure the safety of the vehicle 700.

Figure 7:
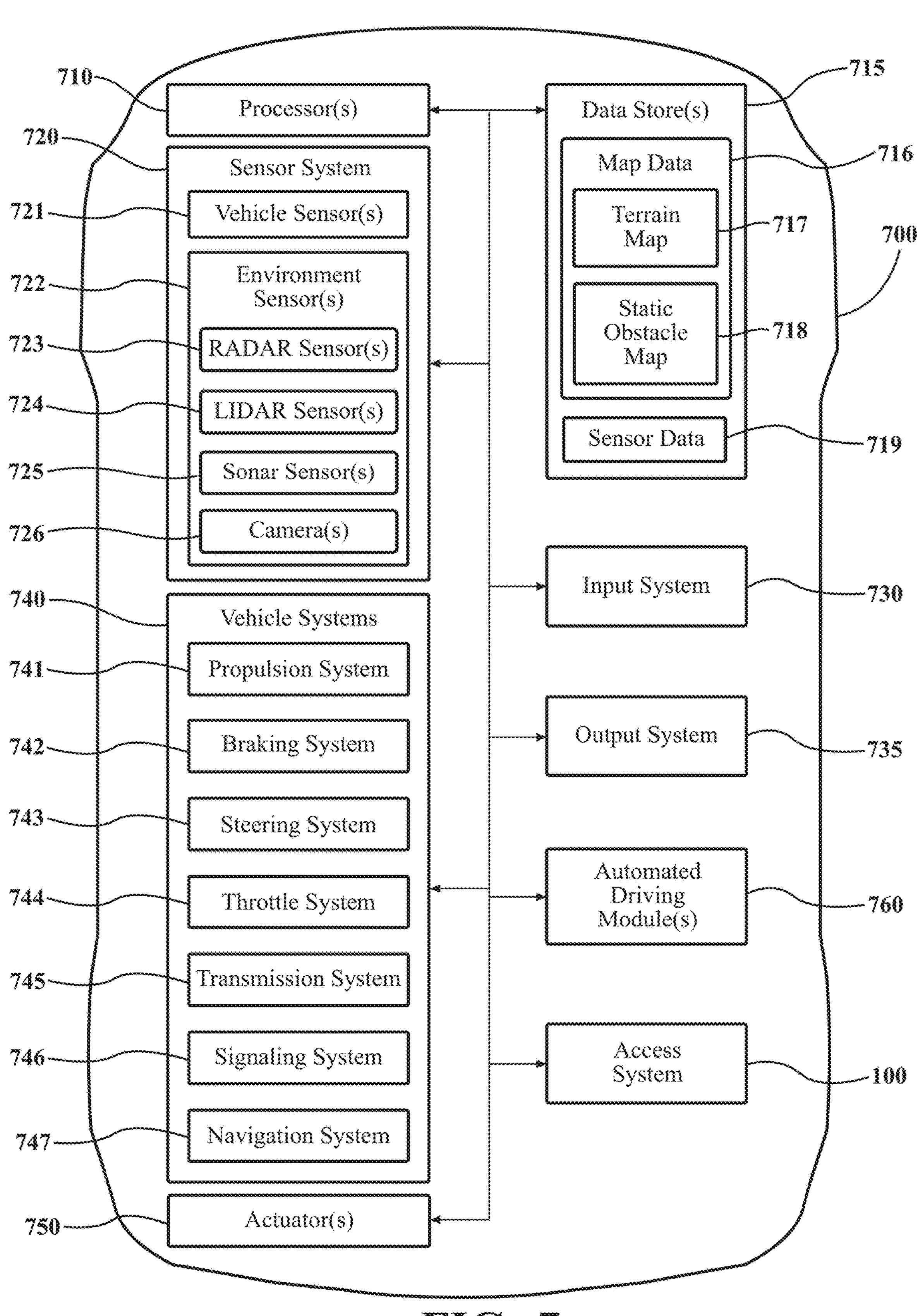
FIG. 7 illustrates one embodiment of a vehicle within which systems and methods disclosed herein may be implemented.

Referring to FIG. 7, an example of a vehicle 700 is illustrated. As used herein, a "vehicle" is any form of transport that may be motorized or otherwise powered. In one or more implementations, the vehicle 700 is an automobile. While arrangements will be described herein with respect to automobiles, it will be understood that embodiments are not limited to automobiles. In some implementations, the vehicle 700 may be a robotic device or a form of transport that, for example, includes sensors to perceive aspects of the surrounding environment and thus benefits from the functionality discussed herein.

The vehicle 700 also includes various elements. It will be understood that in various embodiments it may not be necessary for the vehicle 700 to have all of the elements shown in FIG. 7. The vehicle 700 can have different combinations of the various elements shown in FIG. 7. Further, the vehicle 700 can have additional elements to those shown in FIG. 7. In some arrangements, the vehicle 700 may be implemented without one or more of the elements shown in FIG. 7. While the various elements are shown as being located within the vehicle 700 in FIG. 7, it will be understood that one or more of these elements can be located external to the vehicle 700. Further, the elements shown may be physically separated by large distances. For example, as discussed, one or more components of the disclosed system can be implemented within a vehicle while further components of the system are implemented within a cloud-computing environment or other system that is remote from the vehicle 700.

It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the vehicle 700 includes a access system 100 that is implemented to perform methods and other functions as disclosed herein relating to improving mapping through synthesizing probe data.

FIG. 7 will now be discussed in full detail as an example environment within which the system and methods disclosed herein may operate. In some instances, the vehicle 700 is configured to switch selectively between an autonomous mode, one or more semi-autonomous modes, and/or a manual mode. "Manual mode" means that all of or a majority of the control and/or maneuvering of the vehicle is performed according to inputs received via manual human-machine interfaces (HMIs) (e.g., steering wheel, accelerator pedal, brake pedal, etc.) of the vehicle 700 as manipulated by a user (e.g., human driver). In one or more arrangements, the vehicle 700 can be a manually-controlled vehicle that is configured to operate in only the manual mode.

In one or more arrangements, the vehicle 700 implements some level of automation in order to operate autonomously or semi-autonomously. As used herein, automated control of the vehicle 700 is defined along a spectrum according to the SAE J3016 standard. The SAE J3016 standard defines six levels of automation from level zero to five. In general, as described herein, semi-autonomous mode refers to levels zero to two, while autonomous mode refers to levels three to five. Thus, the autonomous mode generally involves control and/or maneuvering of the vehicle 700 along a travel route via a computing system to control the vehicle 700 with minimal or no input from a human driver. By contrast, the semi-autonomous mode, which may also be referred to as advanced driving assistance system (ADAS), provides a portion of the control and/or maneuvering of the vehicle via a computing system along a travel route with a vehicle operator (i.e., driver) providing at least a portion of the control and/or maneuvering of the vehicle 700.

With continued reference to the various components illustrated in FIG. 7, the vehicle 700 includes one or more processors 710. In one or more arrangements, the processor(s) 710 can be a primary/centralized processor of the vehicle 700 or may be representative of many distributed processing units. For instance, the processor(s) 710 can be an electronic control unit (ECU). Alternatively, or additionally, the processors include a central processing unit (CPU), a graphics processing unit (GPU), an ASIC, an microcontroller, a system on a chip (SoC), and/or other electronic processing units that support operation of the vehicle 700.

The vehicle 700 can include one or more data stores 715 for storing one or more types of data. The data store 715 can be comprised of volatile and/or non-volatile memory. Examples of memory that may form the data store 715 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 715 is a component of the processor(s) 710. In general, the data store 715 is operatively connected to the processor(s) 710 for use thereby. The term "operatively connected," as used throughout this description, can include direct or indirect connections, including connections without direct physical contact.

In one or more arrangements, the one or more data stores 715 include various data elements to support functions of the vehicle 700, such as semi-autonomous and/or autonomous functions. Thus, the data store 715 may store map data 716 and/or sensor data 719. The map data 716 includes, in at least one approach, maps of one or more geographic areas. In some instances, the map data 716 can include information about roads (e.g., lane and/or road maps), traffic control devices, road markings, structures, features, and/or landmarks in the one or more geographic areas. The map data 716 may be characterized, in at least one approach, as a high-definition (HD) map that provides information for autonomous and/or semi-autonomous functions.

In one or more arrangements, the map data 716 can include one or more terrain maps 717. The terrain map(s) 717 can include information about the ground, terrain, roads, surfaces, and/or other features of one or more geographic areas. The terrain map(s) 717 can include elevation data in the one or more geographic areas. In one or more arrangements, the map data 716 includes one or more static obstacle maps 718. The static obstacle map(s) 718 can include information about one or more static obstacles located within one or more geographic areas. A "static obstacle" is a physical object whose position and general attributes do not substantially change over a period of time. Examples of static obstacles include trees, buildings, curbs, fences, and so on.

The sensor data 719 is data provided from one or more sensors of the sensor system 720. Thus, the sensor data 719 may include observations of a surrounding environment of the vehicle 700 and/or information about the vehicle 700 itself. In some instances, one or more data stores 715 located onboard the vehicle 700 store at least a portion of the map data 716 and/or the sensor data 719. Alternatively, or in addition, at least a portion of the map data 716 and/or the sensor data 719 can be located in one or more data stores 715 that are located remotely from the vehicle 700.

As noted above, the vehicle 700 can include the sensor system 720. The sensor system 720 can include one or more sensors. As described herein, "sensor" means an electronic and/or mechanical device that generates an output (e.g., an electric signal) responsive to a physical phenomenon, such as electromagnetic radiation (EMR), sound, etc. The sensor system 720 and/or the one or more sensors can be operatively connected to the processor(s) 710, the data store(s) 715, and/or another element of the vehicle 700.

Various examples of different types of sensors will be described herein. However, it will be understood that the embodiments are not limited to the particular sensors described. In various configurations, the sensor system 720 includes one or more vehicle sensors 721 and/or one or more environment sensors. The vehicle sensor(s) 721 function to sense information about the vehicle 700 itself. In one or more arrangements, the vehicle sensor(s) 721 include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle 700.

As noted, the sensor system 720 can include one or more environment sensors 722 that sense a surrounding environment (e.g., external) of the vehicle 700 and/or, in at least one arrangement, an environment of a passenger cabin of the vehicle 700. For example, the one or more environment sensors 722 sense objects the surrounding environment of the vehicle 700. Such obstacles may be stationary objects and/or dynamic objects. Various examples of sensors of the sensor system 720 will be described herein. The example sensors may be part of the one or more environment sensors 722 and/or the one or more vehicle sensors 721. However, it will be understood that the embodiments are not limited to the particular sensors described. As an example, in one or more arrangements, the sensor system 720 includes one or more radar sensors 723, one or more LIDAR sensors 724, one or more sonar sensors 725 (e.g., ultrasonic sensors), and/or one or more cameras 726 (e.g., monocular, stereoscopic, RGB, infrared, etc.).

Continuing with the discussion of elements from FIG. 7, the vehicle 700 can include an input system 730. The input system 730 generally encompasses one or more devices that enable the acquisition of information by a machine from an outside source, such as an operator. The input system 730 can receive an input from a vehicle passenger (e.g., a driver/operator and/or a passenger). Additionally, in at least one configuration, the vehicle 700 includes an output system 735. The output system 735 includes, for example, one or more devices that enable information/data to be provided to external targets (e.g., a person, a vehicle passenger, another vehicle, another electronic device, etc.).

Furthermore, the vehicle 700 includes, in various arrangements, one or more vehicle systems 740. Various examples of the one or more vehicle systems 740 are shown in FIG. 7. However, the vehicle 700 can include a different arrangement of vehicle systems. It should be appreciated that although particular vehicle systems are separately defined, each or any of the systems or portions thereof may be otherwise combined or segregated via hardware and/or software within the vehicle 700. As illustrated, the vehicle 700 includes a propulsion system 741, a braking system 742, a steering system 743, a throttle system 744, a transmission system 745, a signaling system 746, and a navigation system 747.

The navigation system 747 can include one or more devices, applications, and/or combinations thereof to determine the geographic location of the vehicle 700 and/or to determine a travel route for the vehicle 700. The navigation system 747 can include one or more mapping applications to determine a travel route for the vehicle 700 according to, for example, the map data 716. The navigation system 747 may include or at least provide connection to a global positioning system, a local positioning system or a geolocation system.

In one or more configurations, the vehicle systems 740 function cooperatively with other components of the vehicle 700. For example, the processor(s) 710, the access system 100, and/or automated driving module(s) 760 can be operatively connected to communicate with the various vehicle systems 740 and/or individual components thereof. For example, the processor(s) 710 and/or the automated driving module(s) 760 can be in communication to send and/or receive information from the various vehicle systems 740 to control the navigation and/or maneuvering of the vehicle 700. The processor(s) 710, the access system 100, and/or the automated driving module(s) 760 may control some or all of these vehicle systems 740.

For example, when operating in the autonomous mode, the processor(s) 710, the access system 100, and/or the automated driving module(s) 760 control the heading and speed of the vehicle 700. The processor(s) 710, the access system 100, and/or the automated driving module(s) 760 cause the vehicle 700 to accelerate (e.g., by increasing the supply of energy/fuel provided to a motor), decelerate (e.g., by applying brakes), and/or change direction (e.g., by steering the front two wheels). As used herein, "cause" or "causing" means to make, force, compel, direct, command, instruct, and/or enable an event or action to occur either in a direct or indirect manner.

As shown, the vehicle 700 includes one or more actuators 750 in at least one configuration. The actuators 750 are, for example, elements operable to move and/or control a mechanism, such as one or more of the vehicle systems 740 or components thereof responsive to electronic signals or other inputs from the processor(s) 710 and/or the automated driving module(s) 760. The one or more actuators 750 may include motors, pneumatic actuators, hydraulic pistons, relays, solenoids, piezoelectric actuators, and/or another form of actuator that generates the desired control.

As described previously, the vehicle 700 can include one or more modules, at least some of which are described herein. In at least one arrangement, the modules are implemented as non-transitory computer-readable instructions that, when executed by the processor 710, implement one or more of the various functions described herein. In various arrangements, one or more of the modules are a component of the processor(s) 710, or one or more of the modules are executed on and/or distributed among other processing systems to which the processor(s) 710 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an application-specific integrated circuit (ASIC), programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

Furthermore, the vehicle 700 may include one or more automated driving modules 760. The automated driving module(s) 760, in at least one approach, receive data from the sensor system 720 and/or other systems associated with the vehicle 700. In one or more arrangements, the automated driving module(s) 760 use such data to perceive a surrounding environment of the vehicle. The automated driving module(s) 760 determine a position of the vehicle 700 in the surrounding environment and map aspects of the surrounding environment. For example, the automated driving module(s) 760 determines the location of obstacles or other environmental features including traffic signs, trees, shrubs, neighboring vehicles, pedestrians, etc.

The automated driving module(s) 760 either independently or in combination with the access system 100 can be configured to determine travel path(s), current autonomous driving maneuvers for the vehicle 700, future autonomous driving maneuvers and/or modifications to current autonomous driving maneuvers based on data acquired by the sensor system 720 and/or another source. In general, the automated driving module(s) 760 functions to, for example, implement different levels of automation, including advanced driving assistance (ADAS) functions, semi-autonomous functions, and fully autonomous functions, as previously described.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. The phrase "computer-readable storage medium" means a non-transitory storage medium. A computer-readable storage medium may be, for example, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system or device.

Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An access system, comprising:

one or more processors;

a memory communicably coupled to the one or more processors and storing instructions that, when executed by the one or more processors, cause the one or more processors to:

acquire sensor data about an environment of a vehicle;

responsive to receiving a request for accessing the vehicle, determine a context from the sensor data, the context including aspects about the environment and about a person associated with the request for access, wherein the instructions to determine the context including instructions to identify a location of the vehicle in relation to a point of interest and a duration of time that the vehicle has been at the point of interest and instructions to assess whether the duration of time at the point of interest satisfies a threshold thereby indicating whether the person has a capacity to drive the vehicle;

define access privileges for the person according to the context in relation to the threshold; and provide access to the vehicle according to the access privileges.

2. The access system of claim 1, wherein the instructions to define the access privileges include instructions to challenge the person by providing a test in the vehicle for the person, the test determining whether the person is able to drive the vehicle, and wherein the instructions to provide the test include instructions to provide the test when the context satisfies the threshold indicating that the person is potentially incapacitated.

3. The access system of claim 1, wherein the instructions to define the access privileges include instructions to define which functions of the vehicle the person is permitted to access, and wherein the instructions to provide the access include instructions to activate an active set of functions for the vehicle according to the access privileges while disabling an inactive set of functions of the vehicle.

4. The access system of claim 1, wherein the request to access the vehicle is one of a passive request or an active request, the passive request including at least one of a presence of a key fob proximate to the vehicle, and recognition of the person by the vehicle processing the sensor data including a depiction of the person.

5. The access system of claim 1, wherein the instructions to determine the context include instructions to iteratively assess the context relative to the threshold as the sensor data is iteratively acquired by determining attributes of the environment and the person that relate to a capacity of the person to control the vehicle within the environment, and wherein the context indicates whether the person is medically capable of operating the vehicle according to one or more of: an objective metric and a learned metric, the learned metric relating to particularities of the person learned from a history associated with the person.

6. The access system of claim 1, wherein the instructions to determine the context include instructions to identify a variation of learned behaviors of the person from a baseline, and wherein the instructions to define the access privileges include instructions to determine whether the variation satisfies the threshold, and deny access to operate the vehicle when the variation satisfies the threshold.

7. The access system of claim 6, wherein the instructions to determine the context and define the access privileges include instructions to iteratively determine the context and define the access privileges according to changes in the context to ensure that the person remains capable of controlling the vehicle, and wherein the instructions to determine the context execute at least when the person initially attempts to access the vehicle, initially attempts to drive the vehicle, and as the person drives the vehicle along a route.

8. A non-transitory computer-readable medium including instructions that, when executed by one or more processors, cause the one or more processors to:

acquire sensor data about an environment of a vehicle;

responsive to receiving a request for accessing the vehicle, determine a context from the sensor data, the context including aspects about the environment and about a person associated with the request for access, wherein the instructions to determine the context including instructions to identify a location of the vehicle in relation to a point of interest and a duration of time that the vehicle has been at the point of interest and instructions to assess whether the duration of time at the point of interest satisfies a threshold thereby indicating whether the person has a capacity to drive the vehicle;

define access privileges for the person according to the context in relation to the threshold; and provide access to the vehicle according to the access privileges.

9. The non-transitory computer-readable medium of claim 8, wherein the instructions to define the access privileges include instructions to challenge the person by providing a test in the vehicle for the person, the test determining whether the person is able to drive the vehicle, and wherein the instructions to provide the test include instructions to provide the test when the context satisfies the threshold indicating that the person is potentially incapacitated.

10. The non-transitory computer-readable medium of claim 8, wherein the instructions to define the access privileges include instructions to define which functions of the vehicle the person is permitted to access, and wherein the instructions to provide the access include instructions to activate an active set of functions for the vehicle according to the access privileges while disabling an inactive set of functions of the vehicle.

11. The non-transitory computer-readable medium of claim 8, wherein the request to access the vehicle is one of a passive request or an active request, the passive request including at least one of a presence of a key fob proximate to the vehicle, and recognition of the person by the vehicle processing the sensor data including a depiction of the person.

12. A method, comprising:

acquiring sensor data about an environment of a vehicle;

responsive to receiving a request for accessing the vehicle, determining a context from the sensor data, the context including aspects about the environment and about a person associated with the request for access, wherein determining the context includes identifying a location of the vehicle in relation to a point of interest and a duration of time that the vehicle has been at the point of interest and assessing whether the duration of time at the point of interest satisfies a threshold thereby indicating whether the person has a capacity to drive the vehicle;

defining access privileges for the person according to the context in relation to the threshold; and providing access to the vehicle according to the access privileges.

13. The method of claim 12, wherein defining the access privileges includes challenging the person by providing a test in the vehicle for the person, the test determining whether the person is able to drive the vehicle, and wherein providing the test occurs when the context satisfies the threshold indicating that the person is potentially incapacitated.

14. The method of claim 12, wherein defining the access privileges includes defining which functions of the vehicle the person is permitted to access, wherein providing the access includes activating an active set of functions for the vehicle according to the access privileges while disabling an inactive set of functions of the vehicle, and wherein the request to access the vehicle is one of a passive request or an active request, the passive request including at least one of a presence of a key fob proximate to the vehicle, and recognition of the person by the vehicle processing the sensor data including a depiction of the person.

15. The method of claim 12, wherein determining the context includes iteratively assessing the context relative to the threshold as the sensor data is iteratively acquired by determining attributes of the environment and the person that relate to a capacity of the person to control the vehicle within the environment, and wherein the context indicates whether the person is medically capable of operating the vehicle according to one or more of: an objective metric and a learned metric, the learned metric relating to particularities of the person learned from a history associated with the person.

16. The method of claim 12, wherein determining the context includes identifying a variation of learned behaviors of the person from a baseline, and wherein defining the access privileges includes determining whether the variation satisfies the threshold, and denying access to operate the vehicle when the variation satisfies the threshold.

17. The method of claim 16, wherein determining the context and defining the access privileges occurs iteratively according to changes in the context to ensure that the person remains capable of controlling the vehicle, and wherein determining the context occurs at least when the person initially attempts to access the vehicle, initially attempts to drive the vehicle, and as the person drives the vehicle along a route.

* * * * *